United States Patent
Schott

(10) Patent No.: US 6,662,922 B2
(45) Date of Patent: Dec. 16, 2003

(54) SHAFT-HUB-CONNECTION

(75) Inventor: Wilhelm Schott, Cologne (DE)

(73) Assignee: GKN Walterscheid GmbH (DE)

( * ) Notice: Subject to any disclaimer, the term of this patent is extended or adjusted under 35 U.S.C. 154(b) by 0 days.

(21) Appl. No.: 10/013,994

(22) Filed: Dec. 11, 2001

(65) Prior Publication Data

US 2002/0117371 A1 Aug. 29, 2002

(30) Foreign Application Priority Data

Dec. 16, 2000 (DE) .......................... 100 62 866

(51) Int. Cl.$^7$ ................................ F16D 1/09
(52) U.S. Cl. .................. 192/70.16; 403/16; 403/370
(58) Field of Search .................. 192/70.13, 70.16, 192/DIG. 1; 403/16, 370

(56) References Cited

U.S. PATENT DOCUMENTS

| 2,570,604 A | * | 10/1951 | Seigerist ................. 403/370 X |
| 3,143,366 A | | 8/1964 | Nichols |
| 3,776,651 A | * | 12/1973 | Peter et al. ............. 403/370 X |
| 4,402,625 A | | 9/1983 | Rechkin ........................ 403/7 |
| 4,997,285 A | | 3/1991 | Schmidt ..................... 366/279 |
| 5,269,622 A | * | 12/1993 | Mullenberg ................. 403/370 |
| 5,407,047 A | * | 4/1995 | Weidinger et al. ....... 192/70.13 |
| 5,480,016 A | * | 1/1996 | Kurz et al. .............. 192/70.16 |

FOREIGN PATENT DOCUMENTS

DE 2 031 124 7/1974

* cited by examiner

*Primary Examiner*—Richard M. Lorence
(74) *Attorney, Agent, or Firm*—Harness, Dickey & Pierce, P.L.C.

(57) ABSTRACT

A shaft-hub-connection has a shaft with an external face portion seating in a first bore portion (6) of the hub (3). A tensioning screw (19) is provided with a head which is supported on a support disk (11). The disk is non-movably held in an axial direction on the hub (3), in the tensioned condition where the threaded shank (22) sits in the threaded bore (18) of the shaft (14). A nut (23) is between the support disk (11) and the shaft (14). The nut (23) is on the threaded shaft (22). This nut (23) is non-movably retained on the shank. When actuating the tensioning screw (19) in a disconnecting direction the nut (23) abuts the support disk (11), so that the hub (3) and the shaft (14) move away from each other and become separated.

14 Claims, 1 Drawing Sheet

SHAFT-HUB-CONNECTION

CROSS-REFERENCE TO RELATED APPLICATION

This application is based upon and claims priority to German Patent Application 10062866.4-12 filed Dec. 16, 2000, which application is herein expressly incorporated by reference.

BACKGROUND OF THE INVENTION

The invention relates to a shaft-hub-connection.

DE-AS 2 031 124 describes a coupling for fastening a hub onto a shaft. The hub includes a bore with a conical seat face arranged coaxially around a through bore of the hub. The shaft is received in the through bore. The hub is deformable in the area of the conical seat face by axial tensioning of a pressure ring. The pressure ring rests with a corresponding conical bore on the seat face. Headed screws are used for axial tensioning. The headed screws extend through circumferentially distanced through bores of the pressure ring into the threaded bores of the hub. Two nuts, tensioned against each other, are arranged between the hub and the pressure ring on the thread of each headed screw. The tensioning of the pressure ring is achieved by the heads of the headed screws pushing against the pressure ring when the screws are threaded into the threaded bores. During disconnection, the two nuts, tensioned relative to each other, act on the pressure ring.

U.S. Pat. No. 3,143,366 describes a shaft-hub-connection with a tensioning screw. The hub has a conical bore. A shaft with a correspondingly conical face is received within the conical bore. The hub has a step in its bore and the shaft has a threaded bore. A headed screw with a collar abuts the step and engages a central threaded bore of the shaft. A retaining ring is inserted into a groove distanced from the step in the bore of the hub forming the step. Thus, the collar is arranged between the step and the retaining ring. In order to tension the shaft and the hub, the collar is supported on the step. In order to disconnect the shaft and the hub, the collar is supported on the retaining ring.

SUMMARY OF THE INVENTION

Accordingly, it is an object of the invention to provide a shaft-hub-connection, which enables a simple disconnection without additional pull-off tools.

A shaft-hub-connection according to the invention includes a hub with a first front face and a second front face arranged parallel to the first front face. A first through bore extends between the two front faces. The first through bore is centered on a longitudinal axis. Also, the first through bore has a first bore portion. A support disk has a second through bore. The support disk is positioned along the longitudinal axis. The support disk is non-movably positioned on the hub at the end of the first bore position close to the second front face. A shaft, with an external face portion, is formed fit to the first bore portion of the hub. The shaft is centered on the longitudinal axis. Also, the shaft includes a threaded bore starting at a front face of the shaft and centered on the longitudinal axis.

A tensioning screw includes a head and a threaded shank. The tensioning screw is screwed into the threaded bore starting from the second front face of the hub through the second through bore of the support disk. A nut is non-rotatably retained on the threaded shank between the support disk and the front face of the shaft. A gap is formed relative to the support disk. The first bore portion of the hub and the external face portion of the shaft received in the first bore portion, are formed such that at least, starting from a specific insertion depth of the shaft into the first bore portion, a frictional resistance and/or a resistance resulting from the shape of the external face and the first bore portion act to oppose tensioning of the external face portion and the first bore portion.

An advantage of this solution is that the tensioning screw used to tension the connection can also be used to disconnect the connection. During the first mounting, a connection between the support disk and the tensioning screw has to be achieved. Accordingly, the tensioning screw has to be inserted into the bore of the support disk. Afterwards, the nut is screwed onto the threaded shank of the tensioning screw to take up the predetermined position. Thus, the support disk is arranged between the head and the nut. Further, the support disk may be mounted on the hub such that the support disk is non-displaceably retained in the axial direction along the longitudinal axis. Accordingly, tensioning of the hub with the shaft may be achieved such that the tensioning screw enters into the threaded bore of the shaft. When the screw is unscrewed, the nut, fixed on the threaded shank, abuts the support disk. When the tensioning screw is turned further, an axial support of the tensioning screw is achieved on the support disk. The tensioning screw presses the shaft, with its external face portion, out of the first bore portion, or moves the hub away from the shaft, respectively, as the support disk is axially retained.

In a preferred embodiment, the hub has a second bore portion. The second bore portion starts from the second front face and has an enlarged diameter relative to the first bore portion. Thus, a step face is formed between the first and the second bore portions.

The support disk is inserted into the second bore portion. The support disk abuts the step face and is retained by retaining means. The support disk, together with the head of the tensioning screw, is received in the second bore portion. The second bore portion has an enlarged diameter relative to the first bore portion. This enables a simple centering of a tool to actuate the screw in reference to the head of the tensioning screw.

A retaining ring is provided to retain the support disk in the second bore portion. The retaining ring is kept in a retaining groove in the second bore portion of the hub.

The nut is a crown nut to ensure that, when disconnecting the shaft-hub-connection, no relative movement of the nut is achieved towards the threaded shank. The nut is retained by a split pin on the threaded shank against displacement.

The play-free connection between the first bore portion of the hub and the external face portion insertable into the first bore portion can be achieved such that the first bore portion of the hub is conically tapered in the direction to the second front face. Also, the external face portion of the shaft is correspondingly conically formed. Alternatively it is possible for the first bore portion to have a tapered conical portion extending to the second support face. This portion is followed by a portion extending to the first front face. The following portion has teeth of constant tooth height which extend parallel to the longitudinal axis. Also, the external face portion of the shaft has fitting portions to receive the teeth.

Preferably the shaft-hub-connection is used in a clutch. The hub is part of the clutch and the shaft is part of a driving shaft.

Additional advantages and features of the present invention will become apparent from the subsequent description and the appended claims, taken in conjunction with the accompanying drawings.

BRIEF DESCRIPTION OF THE DRAWINGS

Two preferred embodiments of the invention are explained in detail by means of the drawings wherein.

DETAILED DESCRIPTION OF THE PREFERRED EMBODIMENTS

Figures 1, 2:
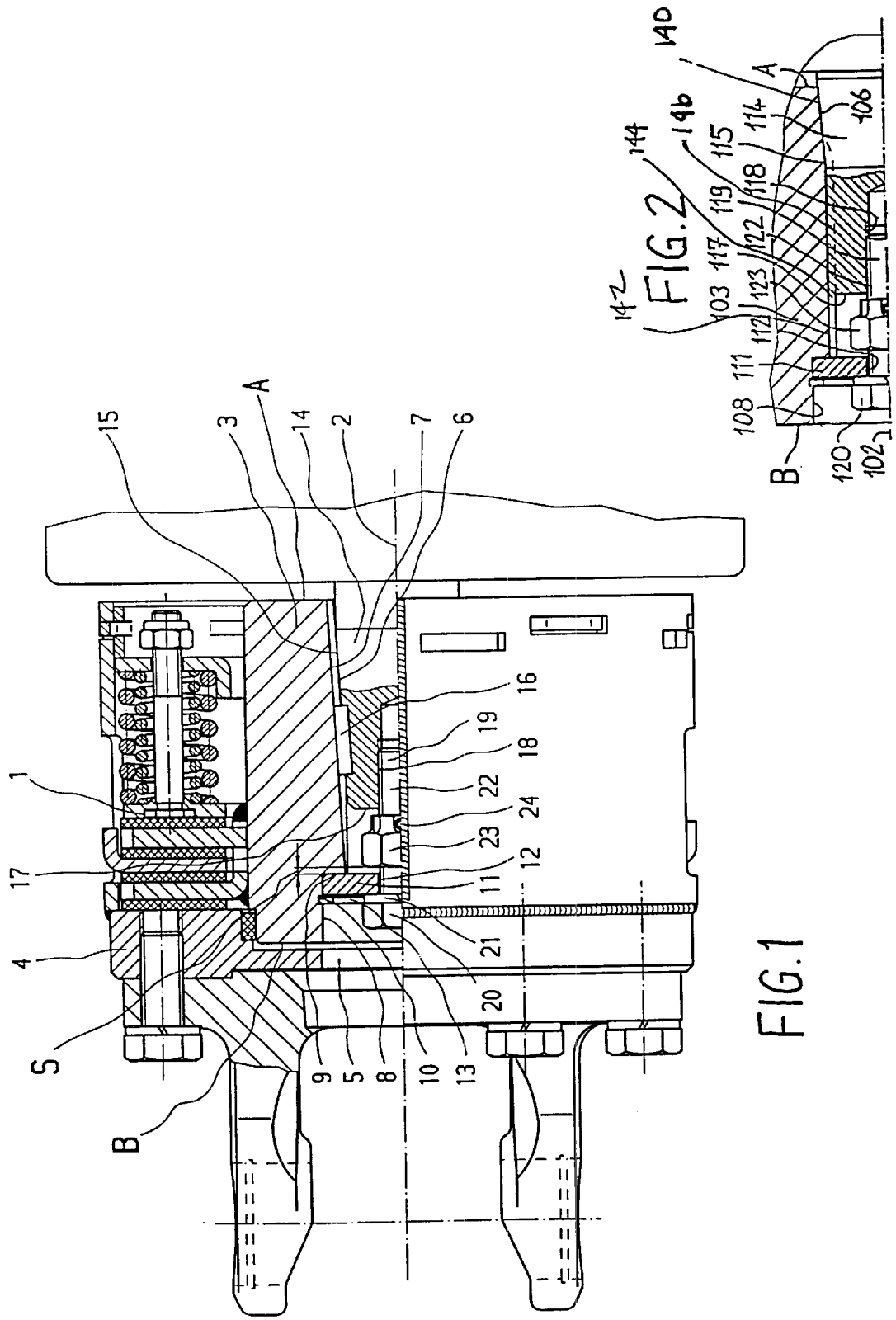
FIG. 1 is a longitudinal sectional view of a first embodiment of a shaft-hub-connection of a friction clutch.
FIG. 2 is an enlarged longitudinal half section view of a second embodiment of a shaft-hub-connection.

Turning to FIG. 1 a friction clutch is shown and designated with the reference numeral 1. The friction clutch 1 defines a longitudinal axis 2, which also represents the rotation axis. The friction clutch 1 includes a hub 3 and a housing 4. The housing 4 is rotatable around the longitudinal axis 2 relative to the hub 3. A friction arrangement is effectively loaded by a spring arrangement between the hub 3 and housing 4. A bore 5, centered on the longitudinal axis 2, is provided in the housing 4. The hub 3, arranged rotatably in the housing 4, has a first central through bore. The center through bore includes a first bore portion 6, which starts from the first front face A of the hub 3. The first bore portion 6 is tapered and has a reduced diameter in the direction to the second front face B. This means, that the first bore portion 6 is conically formed. Furthermore, a groove 7 is provided in the first bore portion 6. A second bore portion 8 is formed into the second front face B. The second bore portion 8 has an enlarged diameter and follows the first bore portion 6 starting from the first bores smallest diameter. Accordingly, a step face 9 is formed between the first bore portion 6 and the second bore portion 8. A circumferential retaining groove 10 is provided in the second bore portion 8 axially distanced from the step face 9. A support disk 11, which has a bore 12 centered on the longitudinal axis 2, is mounted to rest against the step face 9. The support disk 11 is axially fixed by a retaining ring 13. The ring 13 engages the retaining groove 10.

A shaft 14 is inserted into the first bore portion 6 of the hub 3. The shaft 14 has an external face portion 15, which is inserted into the hub 3 starting from the first front face A. The external face portion 15 is conical, corresponding to the first bore portion 6. Furthermore, a wedge 16 is engaged in a groove in the external face portion 15. The wedge is engaged with the groove 7 in the first bore portion 6 of the hub 3.

A threaded bore 18 is formed in the shaft 14. The threaded bore 18 starts from the front face 17 of the shaft. A tensioning screw 19, with its threaded shank 22, can be screwed into the threaded bore 18. The tensioning screw 19 further includes a head 20. The head 20 is supported on the side face of the support disk 11 facing the second front face B. A lock washer 21 is positioned between the head 20 and the support disk 11 when the tensioning screw 19 is screwed into the threaded bore 18.

A nut 23 in the form of a crown nut is screwed onto the threaded shank 22. The nut 23 is distanced from the side face of the support disk 11 facing the first front face A. Thus, when tensioning the connection, the tensioning screw 19, with the threaded shank 22, can be securely threaded into the threaded bore 18. Furthermore, the nut 23 is fixed by a split pin 24 onto the threaded shank 22. To disconnect the connection, the threaded shank 22 of the tensioning screw 19 is screwed out of the threaded bore 18. Accordingly, the head 20 together with the nut 23 move away from the front face 17, until the gap S is used up and the nut 23 abuts the side face of the support disk 11 facing the first front face A. During further actuation of the tensioning screw 19, since the nut 23 cannot be moved on the threaded shank 22, the hub 3 and the shaft 14 move relative towards each other. At the same time, the front face 17 of the shaft moves away from the support disk 11. Accordingly, it is possible, to reliably use the tensioning screw 19, which is otherwise only used to fasten the shaft-hub-connection, to disconnect the shaft-hub-connection.

The embodiment according to FIG. 2 differs from the embodiment according to FIG. 1 only in the design of the first bore portion 106 of the hub 103 and in the design of the external face portion 115 of the shaft 114. The first bore portion 106 is therefore, split into two portions. Starting from the first front face A, a first conically tapered portion 140 is present. Following the conical portion 140 is a second portion 142 extending toward front face B. The second portion 142 includes teeth 144 which extend parallel to the longitudinal axis 102. The teeth have a constant tooth height. The external face portion 115 of the shaft 114 is formed with corresponding teeth 146. In view of the further features, there are no differences between the embodiment of FIG. 1, so that the description of FIG. 1 applies to FIG. 2 For ease, parts which were described in connection with FIG. 1, are referenced with numerals in FIG. 2, that are increased by the value 100 for corresponding parts.

While the above detailed description describes the preferred embodiment of the present invention, the invention is susceptible to modification, variation and alteration without deviating from the scope and fair meaning of the subjoined claims.

What is claimed is:

1. The shaft-hub-connection comprising:

a hub;

a first front face and a second front face arranged parallel to the first front face on said hub;

a first through bore in said hub extending between the first and second front faces and centered on a longitudinal axis, said first through bore having a first bore portion;

a support disk having a second through bore, said support disk being non-movably positioned along the longitudinal axis of the hub at the end of the first bore portion close to the second front face;

a shaft having an external face portion form fitted to the first bore portion of the hub, said shaft being centered on the longitudinal axis;

a threaded bore in said shaft starting at a front face of the shaft and centered on the longitudinal axis;

a tensioning screw having a head and a threaded shank, said tensioning screw being screwed into the threaded bore starting from the second front face of the hub through the second through bore of the support disk, and a nut non-rotatably retained on the threaded shank between the support disk and the front face of the shaft with a gap formed relative to the support disk; and wherein the first bore portion of the hub and the external face portion of the shaft received in the first bore portion, being formed such that, starting from a specific insertion depth of the shaft into the first bore portion, a frictional resistance acts to oppose tensioning of the external face portion and the first bore portion.

2. The shaft-hub-connection according to claim 1, wherein:

the hub has a second bore portion starting from the second front face, said second bore portion having an enlarged diameter relative to the first bore portion, a step face being formed between the first and the second bore portions; and said support disk being inserted into the second bore portion abutting the step face and being retained by retaining means.

3. The shaft-hub-connection according to claim 2, wherein:

the retaining means being a retaining ring, retained in a retaining groove in the second bore portion of the hub.

4. The shaft-hub-connection according to claim 1, wherein:

the nut is a crown nut and is retained against displacement on the threaded shank by a split pin.

5. The shaft-hub-connection according to claim 1, wherein:

the first bore portion of the hub is conically tapered in the direction to the second front face and the external face portion of the shaft is correspondingly conically formed.

6. The shaft-hub-connection according to claim 1, wherein:

the first bore portion has a portion tapered conically to the second front face followed by a second portion extending from the first front face, said second portion having teeth of constant tooth height, said teeth extending parallel to the longitudinal axis and the external face portion of the shaft having corresponding fitting portions for said teeth.

7. The shaft-hub-connection according to claim 1, wherein:

the hub is part of a clutch and the shaft is part of a driving shaft.

8. The shaft-hub-connection comprising:

a hub;

a first front face and a second front face arranged parallel to the first front face on said hub;

a first through bore in said hub extending between the first and second front faces and centered on a longitudinal axis, said first through bore having a first bore portion;

a support disk having a second through bore, said support disk being non-movably positioned along the longitudinal axis of the hub at the end of the first bore portion close to the second front face;

a shaft having an external face portion form fitted to the first bore portion of the hub, said shaft being centered on the longitudinal axis;

a threaded bore in said shaft starting at a front face of the shaft and centered on the longitudinal axis;

a tensioning screw having a head and a threaded shank, said tensioning screw being screwed into the threaded bore starting from the second front face of the hub through the second through bore of the support disk, and a nut non-rotatably retained on the threaded shank between the support disk and the front face of the shaft with a gap formed relative to the support disk; and wherein the first bore portion of the hub and the external face portion of the shaft received in the first bore portion, being formed such that, starting from a specific insertion depth of the shaft into the first bore portion, resistance exist due to the shape of the external face portion and the first bore portion and/or a frictional resistance exist both of which act to oppose tensioning of the external face portion and the first bore portion.

9. The shaft-hub-connection according to claim 8, wherein:

the hub has a second bore portion starting from the second front face, said second bore portion having an enlarged diameter relative to the first bore portion, a step face being formed between the first and the second bore portions; and said support disk being inserted into the second bore portion abutting the step face and being retained by retaining means.

10. The shaft-hub-connection according to claim 9, wherein:

the retaining means being a retaining ring, retained in a retaining groove in the second bore portion of the hub.

11. The shaft-hub-connection according to claim 8, wherein:

the nut is a crown nut and is retained against displacement on the threaded shank by a split pin.

12. The shaft-hub-connection according to claim 8, wherein:

the first bore portion of the hub is conically tapered in the direction to the second front face and the external face portion of the shaft is correspondingly conically formed.

13. The shaft-hub-connection according to claim 8, wherein:

the first bore portion has a portion tapered conically to the second front face followed by a second portion extending from the first front face, said second portion having teeth of constant tooth height, said teeth extending parallel to the longitudinal axis and the external face portion of the shaft having corresponding fitting portions for said teeth.

14. The shaft-hub-connection according to claim 8, wherein:

the hub is part of a clutch and the shaft is part of a driving shaft.

* * * * *